US008939069B2

(12) United States Patent
Taylor

(10) Patent No.: US 8,939,069 B2
(45) Date of Patent: Jan. 27, 2015

(54) COLLAPSIBLE BREAD DOUGH RISING BOX

(76) Inventor: Michael W. Taylor, Williamstown, MA (US)

(*) Notice: Subject to any disclaimer, the term of this patent is extended or adjusted under 35 U.S.C. 154(b) by 1670 days.

(21) Appl. No.: 12/276,307

(22) Filed: Nov. 22, 2008

(65) Prior Publication Data

US 2010/0129492 A1    May 27, 2010

(51) Int. Cl.
A23C 3/02       (2006.01)
A23C 15/04      (2006.01)
A01J 11/04      (2006.01)
A01J 13/00      (2006.01)
A01J 15/14      (2006.01)
A21D 8/02       (2006.01)
A47J 27/04      (2006.01)
F24C 7/08       (2006.01)
A47J 43/24      (2006.01)
A21C 13/00      (2006.01)
(Continued)

(52) U.S. Cl.
CPC . *A21D 8/02* (2013.01); *A47J 27/04* (2013.01); *F24C 7/08* (2013.01); *A47J 43/24* (2013.01); *A21C 13/00* (2013.01); *A21B 3/133* (2013.01); *A23L 3/005* (2013.01); *A23B 7/144* (2013.01); *A23L 3/10* (2013.01); *A23N 15/08* (2013.01); *A23L 3/365* (2013.01)
USPC .............................................. 99/483; 99/467

(58) Field of Classification Search
CPC ........... A23L 3/365; A23L 3/005; A23L 3/10; A21C 13/00; A47J 27/04; A47J 43/24; A23N 15/08; A21D 8/02; F24C 7/08; A21B 3/133; A23B 7/144
USPC ........... 99/483, 468, 451, 473, 516, 536, 467; 426/27, 232, 233, 505
See application file for complete search history.

(56) References Cited

U.S. PATENT DOCUMENTS 2,147,024 A * 2/1939 Frisk ............................. 99/468
2,668,898 A * 2/1954 Von Behren ................. 219/404
(Continued)

FOREIGN PATENT DOCUMENTS

JP        01181822 A2    7/1989

OTHER PUBLICATIONS http://findarticles.com/p/articles/mi_m1216/is_n2_v180/ai_6286281, Title of Article: This bread box helps dough rise in a cool house; Title of Item: Google Search Result #1; Date: Jul. 29, 2008; p. 1-2.

*Primary Examiner* — Dana Ross
*Assistant Examiner* — Hemant Mathew
(74) *Attorney, Agent, or Firm* — Malcolm J. Chisholm, Jr.

(57)    ABSTRACT

A collapsible bread dough rising box is disclosed that can be assembled for warming bread dough during rising, and then collapsed into a folded middle section held between a top member and bottom for easy transport and storage. The box can be large enough to hold a large mixing bowl or several bread pans. A multi-position switch or thermostat can be used to maintain the internal temperature at a desired value between 80 and 120 degrees Fahrenheit. Ventilation channels can be cooperative with the thermostat. Lights can indicate power on, heater on, desired temperature reached and/or safety mechanism activated. Hinges can connect the top member and the middle member to the bottom, for easy assembly and folding. The box is affordable for home bakers. In preferred embodiments the middle is composed of molded plastic panels and living hinges that snap together, thereby further minimizing the cost.

14 Claims, 10 Drawing Sheets

(51) Int. Cl.
*A21B 3/13* (2006.01)
*A23L 3/005* (2006.01)
*A23B 7/144* (2006.01)
*A23L 3/10* (2006.01)
*A23N 15/08* (2006.01)
*A23L 3/365* (2006.01)

(56) References Cited

U.S. PATENT DOCUMENTS

| | | | | |
|---|---|---|---|---|
| 3,418,453 A | * | 12/1968 | Sparks | 219/400 |
| 3,502,488 A | * | 3/1970 | Bridgford | 426/62 |
| 3,507,668 A | * | 4/1970 | Bridgford | 426/113 |
| 3,682,154 A | * | 8/1972 | Mollere | 126/9 A |
| 3,734,749 A | * | 5/1973 | Bridgford | 426/62 |
| 4,565,703 A | | 1/1986 | Garbar et al. | |
| 4,667,591 A | * | 5/1987 | Garbar et al. | 99/483 |
| 4,674,402 A | * | 6/1987 | Raufeisen | 99/468 |
| 4,734,293 A | | 3/1988 | Pivonka | |
| 4,882,463 A | * | 11/1989 | Kyougoku et al. | 219/727 |
| 5,033,363 A | * | 7/1991 | King et al. | 99/323.7 |
| 5,216,948 A | * | 6/1993 | Sheppard et al. | 99/483 |
| 5,233,144 A | | 8/1993 | Morino et al. | |
| 5,404,808 A | * | 4/1995 | Smith et al. | 99/483 |
| 5,543,784 A | * | 8/1996 | Mendenhall | 340/568.1 |
| 5,947,009 A | | 9/1999 | Hedenberg | |
| 7,297,905 B2 | | 11/2007 | Kim et al. | |
| 2001/0039884 A1 | | 11/2001 | Backus et al. | |
| 2006/0222271 A1 | * | 10/2006 | Yoffe | 383/102 |
| 2007/0164014 A1 | * | 7/2007 | Saadoun | 219/387 |
| 2008/0149626 A1 | * | 6/2008 | Ly | 219/730 |

* cited by examiner

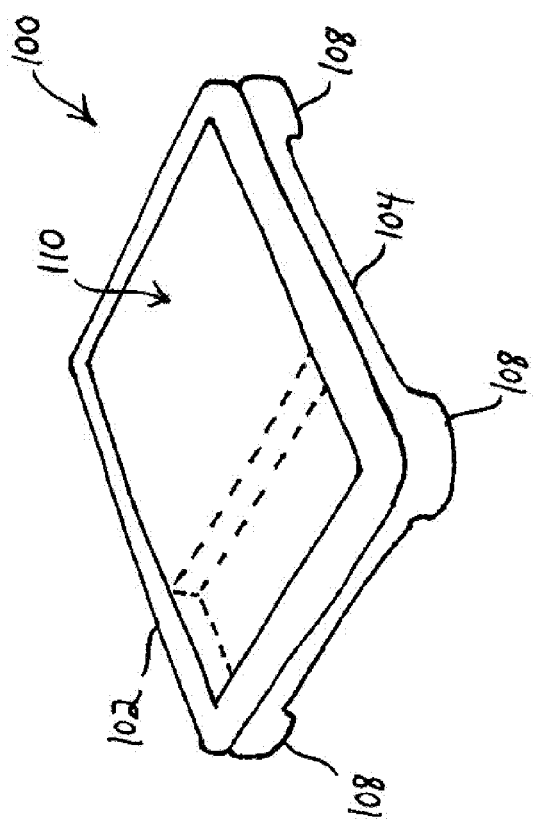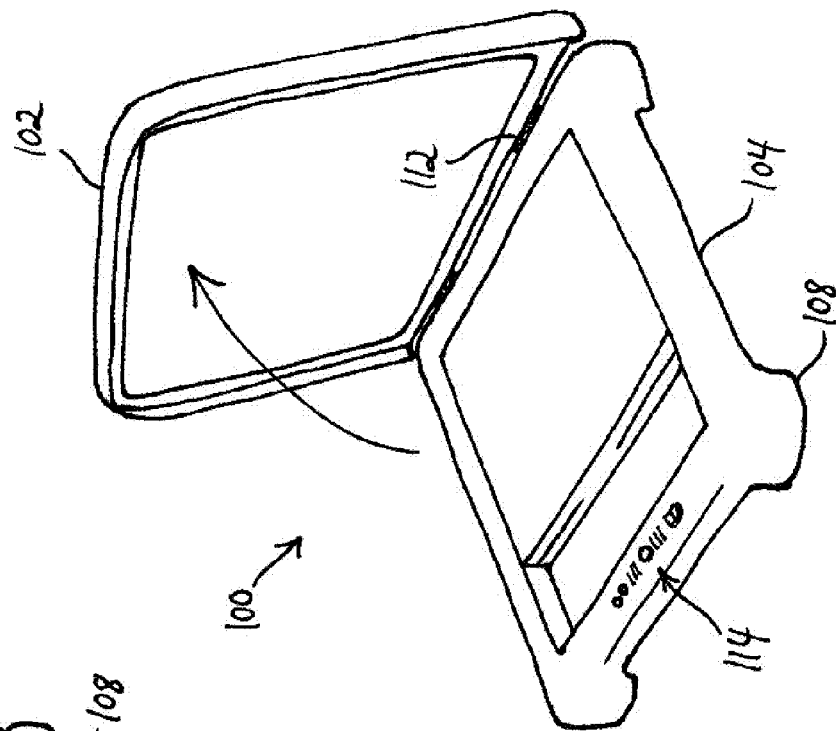

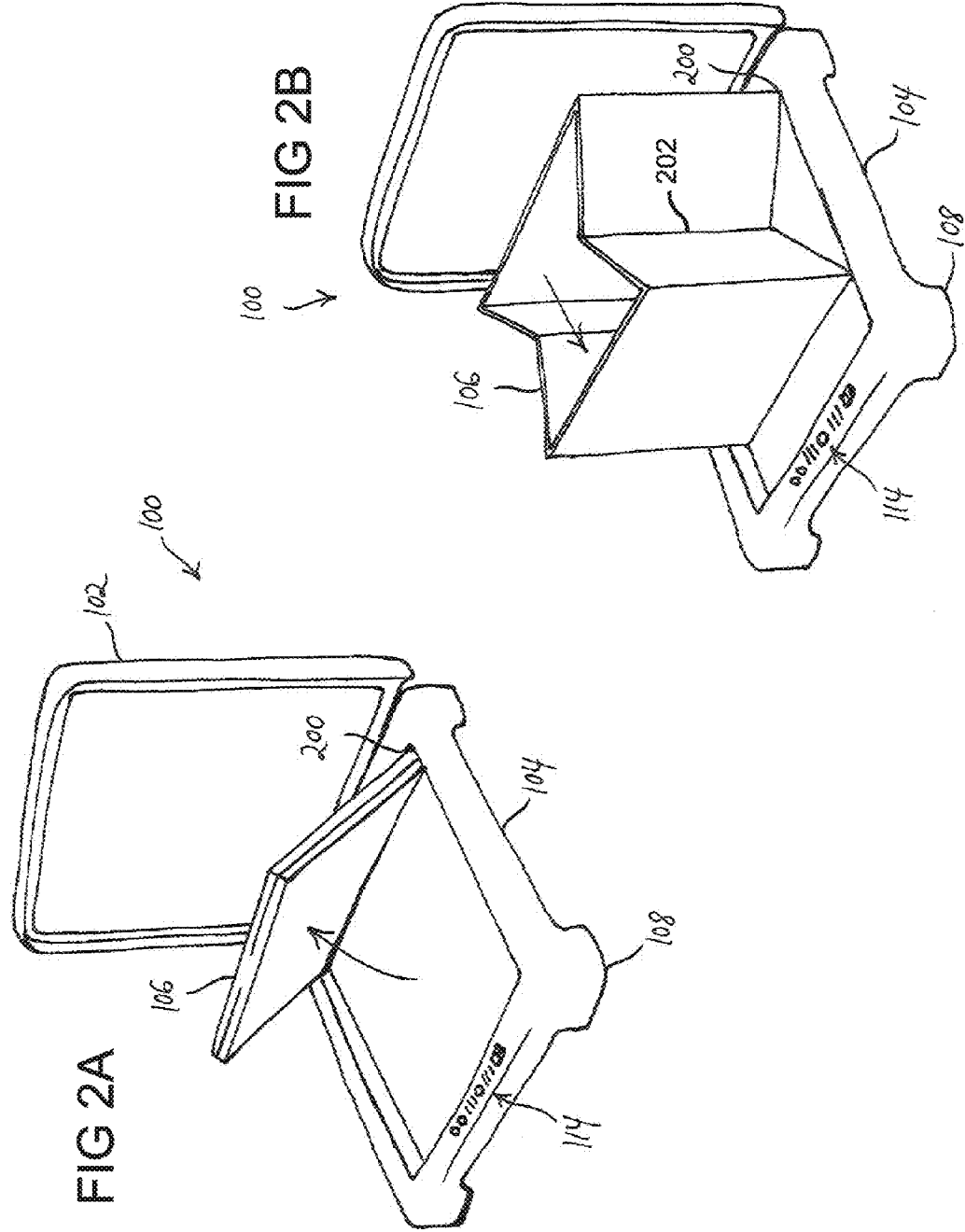

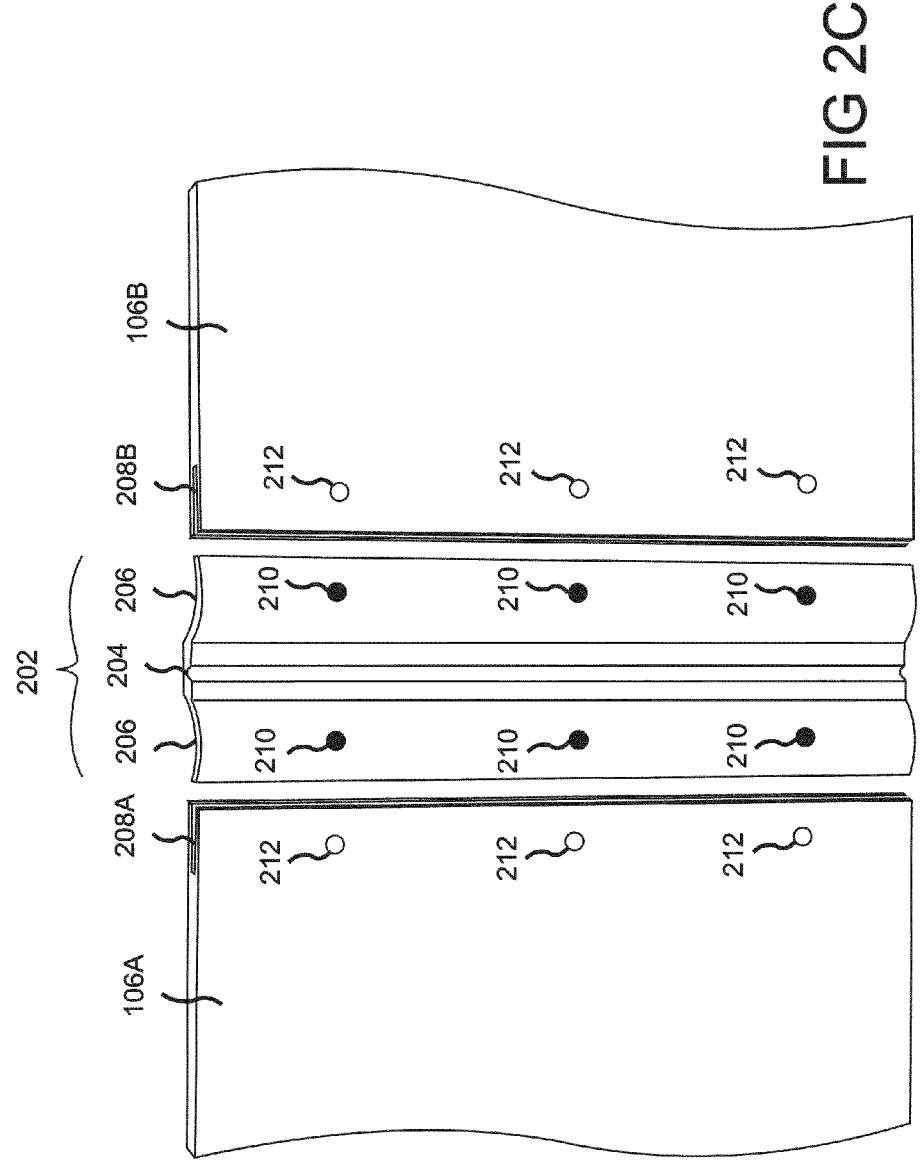

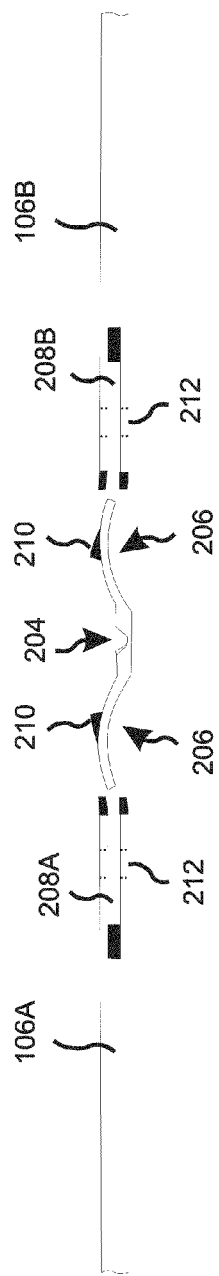
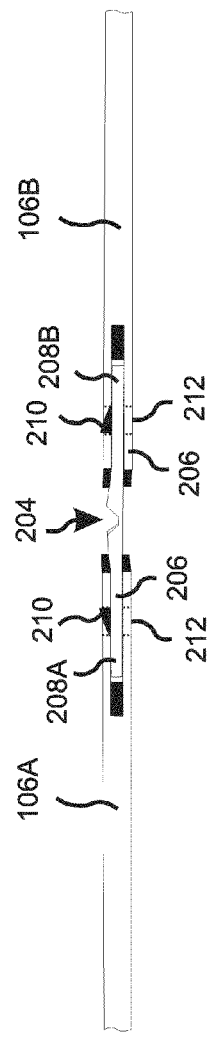

COLLAPSIBLE BREAD DOUGH RISING BOX

FIELD OF THE INVENTION

This invention relates to cooking devices, and more particularly to bread dough rising devices.

BACKGROUND OF THE INVENTION

Home baking of bread and other yeast-leavened foods (herein referred to generically as "bread") is a common and popular pastime for many people. The typical approach to home bread baking involves mixing ingredients, including flour, yeast and water, into a mass of dough, allowing the dough to rise, and then baking the dough in an oven to make bread. The dough is typically kneaded before an initial rising, and then punched down and shaped before a second rising and a final baking stage. Each rising stage generally has its own ideal temperature, with the success of the rising and the quality of the resultant bread depending strongly on maintaining the dough at a temperature that is as close as possible to the ideal temperature throughout each rising period.

Commercial bakeries use proofing ovens to maintain bread dough at ideal temperatures during each rising period. However, commercial proofing ovens are large, expensive, and generally not practical for home bread baking. Conventional home ovens are designed to be heated to relatively high cooking and baking temperatures, and are not able to provide the modestly warm temperatures needed for bread dough rising.

Warming drawers are available for home use that can operate at the lower warming temperatures needed for bread rising. However, these warming drawers must be custom built into kitchen cabinets, and are generally too high in cost to be within the price range of most home owners.

Automatic bread making machines usually include a dough rising cycle and are generally affordable for home owners. However, they require that the dough be placed in a specific baking container within the machine, and do not enable rising of dough in a mixing bowl, a conventional bread pan, and/or other dough containers according to the personal preferences of the user. Furthermore, bread making machines are typically large and bulky, and therefore difficult or inconvenient to store and/or transport. As a result, even if they are used infrequently, home bread making machines tend to occupy premium counter space in a home kitchen on a more or less permanent basis.

SUMMARY OF THE INVENTION

A collapsible bread dough rising box is claimed that can maintain dough at a desired temperature during rising, and is collapsible when not in use for easy transport and storage. In preferred embodiments, when fully assembled, the collapsible bread dough rising box is large enough to hold either a large mixing bowl or several bread pans.

The internal temperature of the collapsible bread dough rising box can be controlled by a thermostat and/or a variable power switch. Indicator lights can be included that indicate whether the power is on or off, whether the heater is active, and/or whether a desired temperature has been reached. A safety mechanism can be included that prevents current from being applied to the heater if the box is improperly assembled or the interior temperature exceeds 140 degrees Fahrenheit. Different levels of heat can be applied according to user preferences. In preferred embodiments the interior of the bread dough rising box is maintained at a temperature between 80 and 120 degrees Fahrenheit.

The collapsible bread dough rising box can be manufactured at a cost that allows it to be sold at a reasonable price to home bakers. In preferred embodiments, inexpensive, injection molded plastic panels and living hinges snap together to form the middle member.

One general aspect of the present invention is a collapsible bread dough rising box that includes the following elements:
 a bottom member;
 a top member;
 a collapsible middle member, the collapsible middle member being foldable so as to fit between the bottom member and the top member when the bread dough rising box is in a storage configuration, the collapsible middle member forming side walls of the bread dough rising box when the collapsible middle member is unfolded and installed between the bottom member and the top member when the bread dough rising box is in a fully assembled configuration; and
 a heating element, cooperative with one of the bottom member and the top member, the heating element being able to warm an interior space formed by the bottom member, the top member, and the collapsible middle member when the bread dough rising box is in the fully assembled configuration.

In preferred embodiments the bread dough rising box also includes an attachment mechanism that is able to attach the top member to the bottom member so as to hold the collapsible middle member between the top member and bottom member when the bread dough rising box is in the storage configuration. In some of these embodiments the attachment mechanism is a detachable hinge that allows the top member to be detached from the bottom member when the hinge is rotated beyond a certain angle.

In certain preferred embodiments the collapsible middle member is attached to the bottom member by a hinge that allows the collapsible middle member to transition between the storage configuration and the fully assembled configuration while remaining attached to the bottom member.

In some preferred embodiments the collapsible middle member includes a living hinge with a thin strip of plastic that can be repeatedly bent without breaking. In some of these embodiments the middle member includes a panel with a slotted edge that has at least one opening, the living hinge includes an edge with at least one protrusion, and the living hinge can be attached to the panel by inserting the edge of the living hinge into the slotted edge of the panel, thereby causing the protrusion on the edge of the living hinge to engage with the opening in the slotted edge of the panel.

In various preferred embodiments the middle member includes a total of four short panels and two long panels, the panels being interconnected at their edges by hinges. And in some preferred embodiments the top member includes a transparent window that enables contents enclosed within the bread dough rising box to be viewed when the bread dough rising box is in the fully assembled configuration.

In preferred embodiments the heating element is able to use at least one of convection, radiation, and conduction to warm the interior space of the bread dough rising box when the bread dough rising box is in the fully assembled configuration. In certain preferred embodiments the heating element is a low-power heating element. In some preferred embodiments the heating element is a thin heating element affixed by an adhesive to the bottom member of the bread dough rising box. And in various preferred embodiments, when the bread dough rising box is in its fully assembled configuration, the heating element is able to maintain a temperature within the interior of the bread dough rising box of between 80 and 120 degrees Fahrenheit.

In preferred embodiments the bread dough rising box further includes a thermostat. In some of these embodiments the bread dough rising box further includes a ventilation system cooperative with the thermostat. And in various embodiments the bread dough rising box further includes a power switch that is settable to low, medium and high power settings.

In certain preferred embodiments the bread dough rising box further includes an indicator light that indicates activation of the bread dough rising box, application of power to the heating element, achieving of a desired temperature within the interior of the bread dough rising box, or activation of a safety mechanism.

In preferred embodiments, the bread dough rising box further includes a rack that is able to support a bread dough container above the bottom member so as to avoid overheating of bread dough contained within the bread dough container. And in some preferred embodiments the bread dough rising box further includes a safety mechanism that prevents application of power to the heating element if an improper rising condition is detected. In some of these embodiments the improper rising condition is the bread dough rising box being incorrectly configured or an interior temperature of the bread dough rising box being above a maximum temperature.

Another general aspect of the present invention is a method for causing yeast-leavened dough to rise. The method includes the following steps:

providing a collapsible bread dough rising box that includes the following elements:
  a bottom member;
  a top member;
  a collapsible middle member, the collapsible middle member being foldable so as to fit between the bottom member and the top member when the bread dough rising box is in a storage configuration, the collapsible middle member forming side walls of the bread dough rising box when the collapsible middle member is unfolded and installed between the bottom member and the top member when the bread dough rising box is in a fully assembled configuration; and
  a heating element, cooperative with one of the bottom member and the top member, the heating element being able to warm an interior space formed by the bottom member, the top member, and the collapsible middle member when the bread dough rising box is in the fully assembled configuration;

unfolding the collapsible middle member;

configuring the collapsible bread dough rising box in its fully assembled configuration such that the middle member is cooperative with the bottom member so as to form side walls;

placing a container containing dough within the interior formed by the bottom member and the side walls;

placing the top member onto the side walls so as to form a closed environment;

activating the heating element so as to provide a desired dough rising temperature within the interior of the bread dough rising box;

allowing the dough to remain within the interior of the bread dough rising box for a time sufficient to allow the dough to rise;

removing the top member from the bread dough rising box;

removing the container and the dough from the bread dough rising box;

deactivating the heating element;

folding the collapsible middle member; and placing the folded collapsible middle member between the top member and the bottom member so as to configure the bread dough rising box in its storage configuration.

BRIEF DESCRIPTION OF THE DRAWINGS

The invention will be more fully understood by reference to the detailed description, in conjunction with the accompanying figures, wherein:

FIG. 1A is an oblique view of a preferred embodiment of the present invention in the fully closed position, with the top closed against the bottom and the middle member collapsed and contained between the top and the bottom;

FIG. 1B is an oblique view of the preferred embodiment of FIG. 1A, showing the top opened away from the bottom while remaining attached to the bottom by a disengageable hinge;

FIG. 2A is an oblique view of the preferred embodiment of FIG. 1A, showing the folded middle member raised upward from the bottom while remaining attached to the bottom by a hinge;

FIG. 2B is an oblique view of the preferred embodiment of FIG. 1A, showing the middle member partially unfolded while the middle member remains attached to the bottom by the hinge;

FIG. 2C is a front perspective view of two panels with slotted edges aligned with a living hinge from a preferred embodiment;

FIG. 2D is a top view of the two panels and living hinge of FIG. 2C in a disassembled configuration;

FIG. 2E is a top view of the two panels and living hinge of FIG. 2C in an assembled configuration;

DETAILED DESCRIPTION OF PREFERRED EMBODIMENTS

Figure 2F:
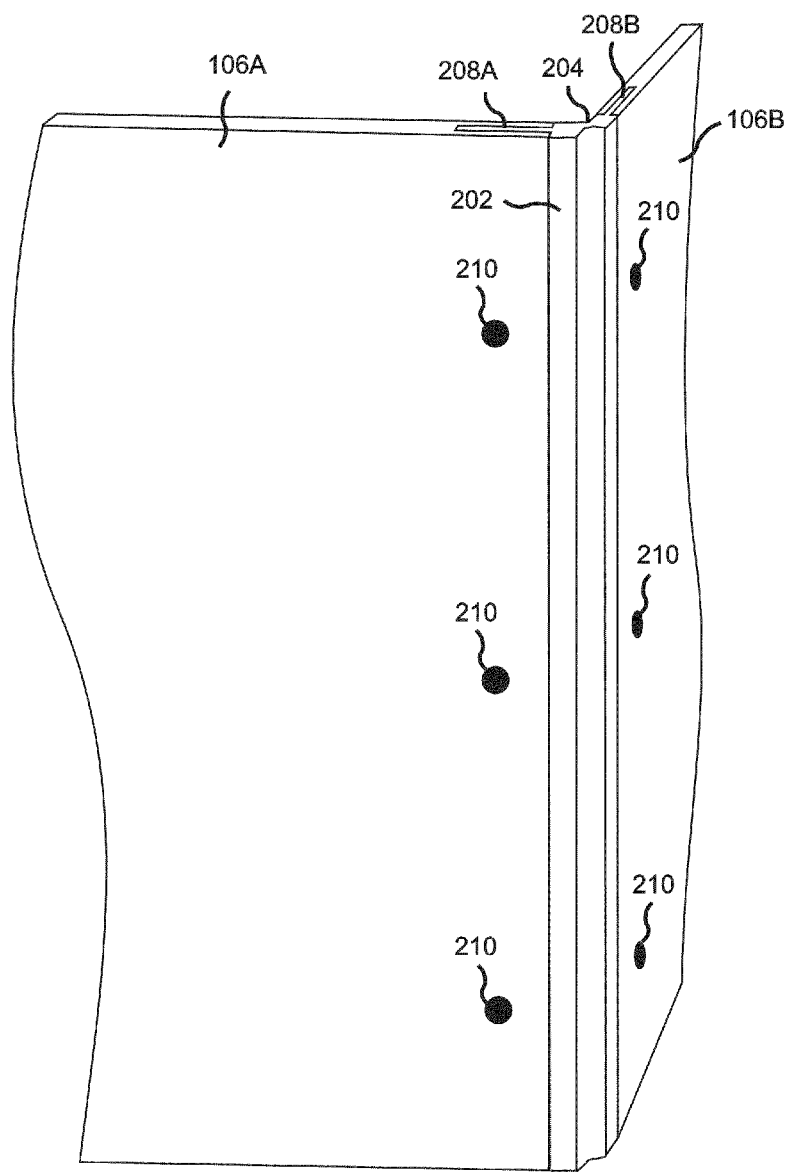
FIG. 2F is a perspective view of the two panels and living hinge of FIG. 2C in an assembled configuration with the hinge bent at approximately 90 degrees.

With reference to FIG. 1A, the present invention is a bread dough rising box 100 that is affordable for home use and collapsible for easy transport and storage. The claimed bread dough rising box 100 can be used for rising of any yeast-leavened dough, all such yeast-leavened doughs being referred to herein generically as "bread" dough. The bread dough rising box 100 includes a top 102, a bottom 104, and a collapsible middle member 106 that can be folded and held between the top 102 and bottom 104 in a storage configuration, as shown in FIG. 1A. In the embodiment of FIG. 1A, the bottom portion 104 includes feet 108 at each of its four corners, and the top 102 includes a transparent window 110, through which the contents of the bread dough rising box 100 can be observed. In FIG. 1A, the middle member 106 in its folded configuration can be seen through the window 108. In the embodiment of FIG. 1A, the top is attached to the bottom by an attachment mechanism (not shown) when the bread dough rising box is in its storage configuration.

FIG. 1B is an oblique angle view of the preferred embodiment of FIG. 1A, showing the top 102 raised from the bottom 104 while remaining attached to the bottom 104 by a disengageable hinge 112. The bottom 104 includes a control panel 114 for monitoring and controlling the warming conditions inside the bread dough rising box 100 while the bread dough rising box 100 is fully assembled and in use.

FIG. 2A is an oblique angle view of the preferred embodiment of FIG. 1A, showing the folded middle member 106 raised upwards from the bottom 104 while remaining attached to the bottom 104 by a hinge 200. In FIG. 2B, the middle member 106 of FIG. 2A is shown as partially unfolded while remaining attached to the bottom 104 by the hinge 200. The middle member 106 unfolds about hinges 202 that connect six panels 106 together so as to form the sides of the fully assembled bread dough rising box 100.

FIG. 2C is a perspective view of two of the panels 106A, 106B of the middle section shown in relationship with a living hinge 202 from a preferred embodiment in which the panels 106 and the living hinge 202 are manufactured by an inexpensive injection plastic molding process and snapped together to form the middle member, The living hinge 202 can be folded by bending it about a thin plastic strip 204 that is formed of a material that can be easily and repeatedly bent without breaking. The living hinge 202 includes two sides 206 that are flexibly curved and can be flattened so as to slide into corresponding slots 208A, 208B in the edges of the two panels 106A, 106B. The flexibly curved sides 206 of the living hinge 202 include protrusions 210 that are pressed against the inside walls of the slots 208A, 208B by a "spring action" of the flexibly curved sides 206 when they are compressed within the slots 208A, 208B. When properly aligned, this causes the protrusions 210 to engage with corresponding openings 212 in the slots 208A, 208B.

FIG. 2D is a top view of the two panels 106A, 106B and living hinge 202 of FIG. 2C in a disassembled configuration. It can be seen in the figure that the protrusions 210 on the flexibly curved sides 206 of the living hinge 202 are beveled, so as to allow them to easily side into the slots 208A, 208B but to catch within the openings 212 in the slots 208A, 208B once the protrusions 210 are engaged with the openings 212.

FIG. 2E is a top view of the two panels 106A, 106B and living hinge 202 of FIG. 2C shown in an assembled configuration. It can be seen that the flexibly curved sides 206 of the living hinge 202 have been flattened so as to allow their insertion in to the slots 208A, 208B in the edges of the two panels 106A, 106B. This flattening causes the flexibly curved sides 206 to press against the inner walls of the slots 208A, 208B, and upon proper alignment, the protrusions 210 attached to the flexibly curved sides 206 of the living hinge 202 are thereby pushed into the openings 212 in the slots 208A, 208B and catch therein, so as to hold the two panels 106A 106B in attachment to the living hinge 202.

FIG. 2F is a perspective view of the two panels 106A, 106B and the living hinge 202 of FIG. 2C shown in an assembled configuration, with the living hinge 202 bent at an angle of approximately 90 degrees.

Figure 3A:
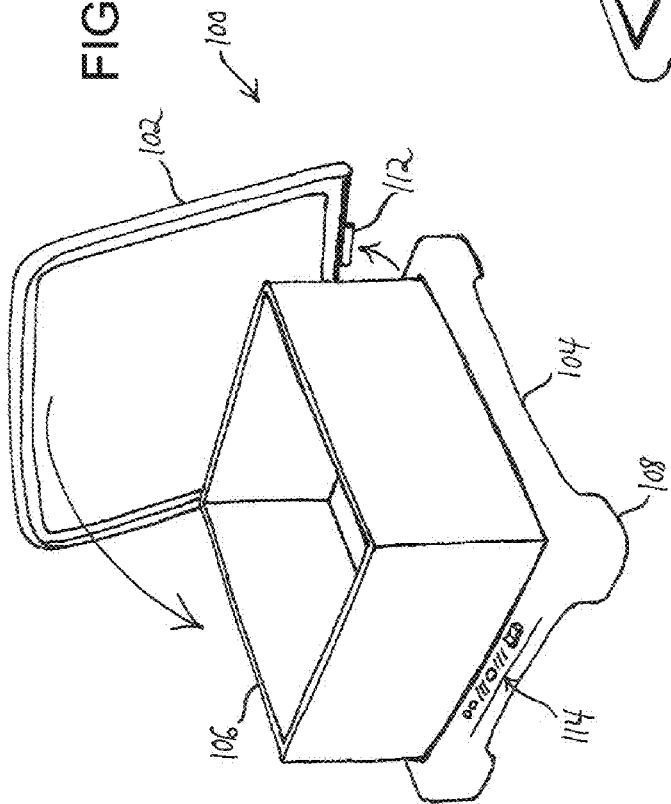
FIG. 3A is an oblique view of the preferred embodiment of FIG. 1A, showing the middle member partially unfolded while remaining attached to the bottom by a hinge, and the top disengaged from the bottom.

FIG. 3A is an oblique angle view of the preferred embodiment of FIG. 1A, with the middle member 106 fully expanded, thereby forming the four sides of the box. The top 102 is shown as being disengaged from its hinge 112 in preparation for placing it on the upper edges of the middle member 106. The hinge 112 in this embodiment is designed to allow disengagement of the top 102 from the bottom 104 when the top 102 is oriented at a right angle to the bottom 104. The middle member 106 in this embodiment is designed to fit firmly in place against the bottom portion 104. In some preferred embodiments, a safety mechanism is included that can detect whether the middle member 106 is fully and properly assembled in its box configuration, and can prevent activation of the heating element when the middle member 106 is not fully or properly assembled.

Figure 3B:
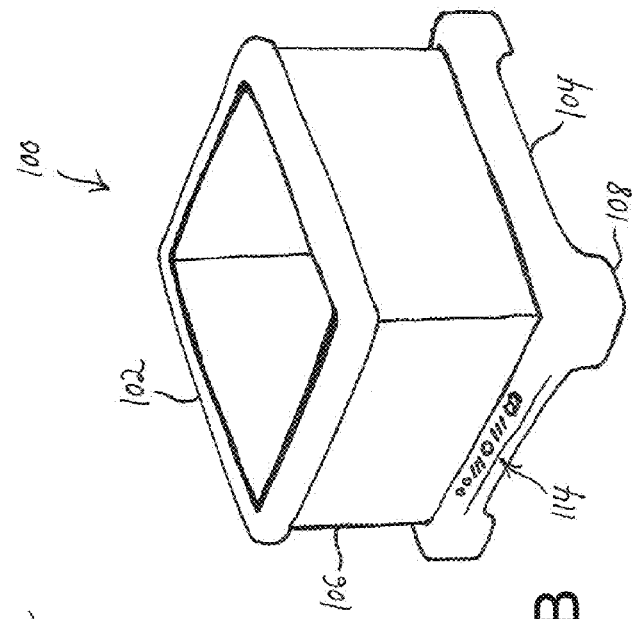
FIG. 3B is an oblique view of the preferred embodiment of FIG. 1A, showing the middle member fully unfolded and forming the four sides of the bread dough rising box, and the top secured to the upper edges of the middle member, thereby forming a closed box, the interior of the bread dough rising box being visible through a transparent window in the top.

FIG. 3B is an oblique angle view of the preferred embodiment of FIG. 3A, with the top 102 placed on top of the upper edges of the middle member 106, thereby forming a closed box 100 in its fully assembled configuration.

Figure 4:
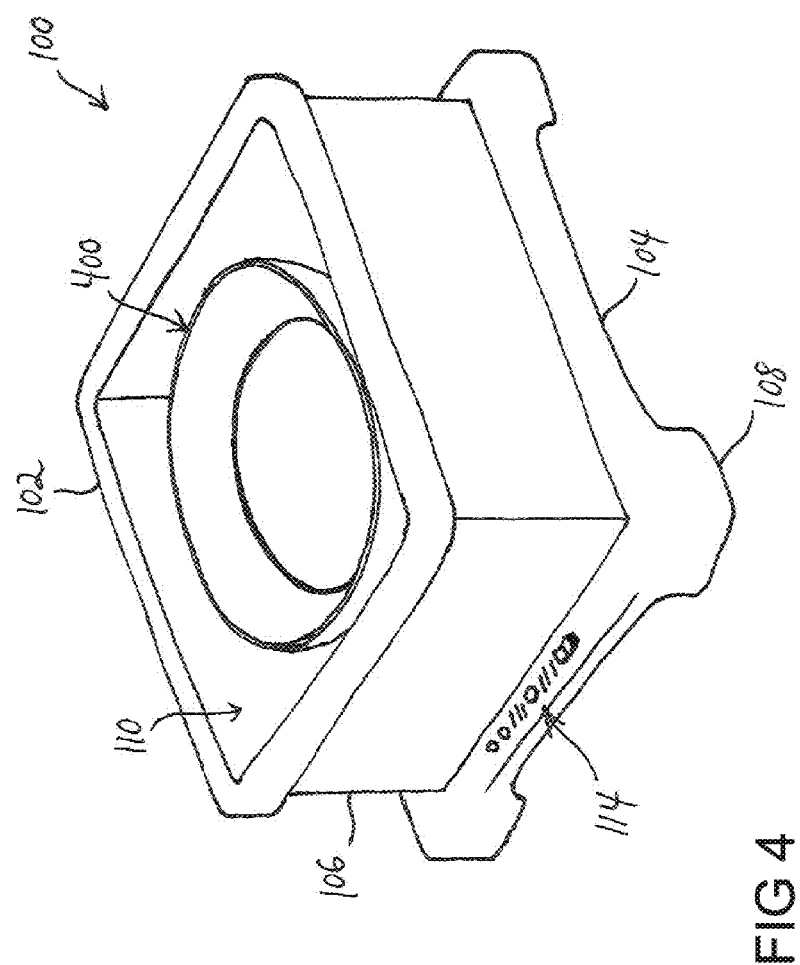
FIG. 4 is an oblique view of the preferred embodiment of FIG. 3B in its closed box configuration, showing a mixing bowl contained within the box.
Figure 5:
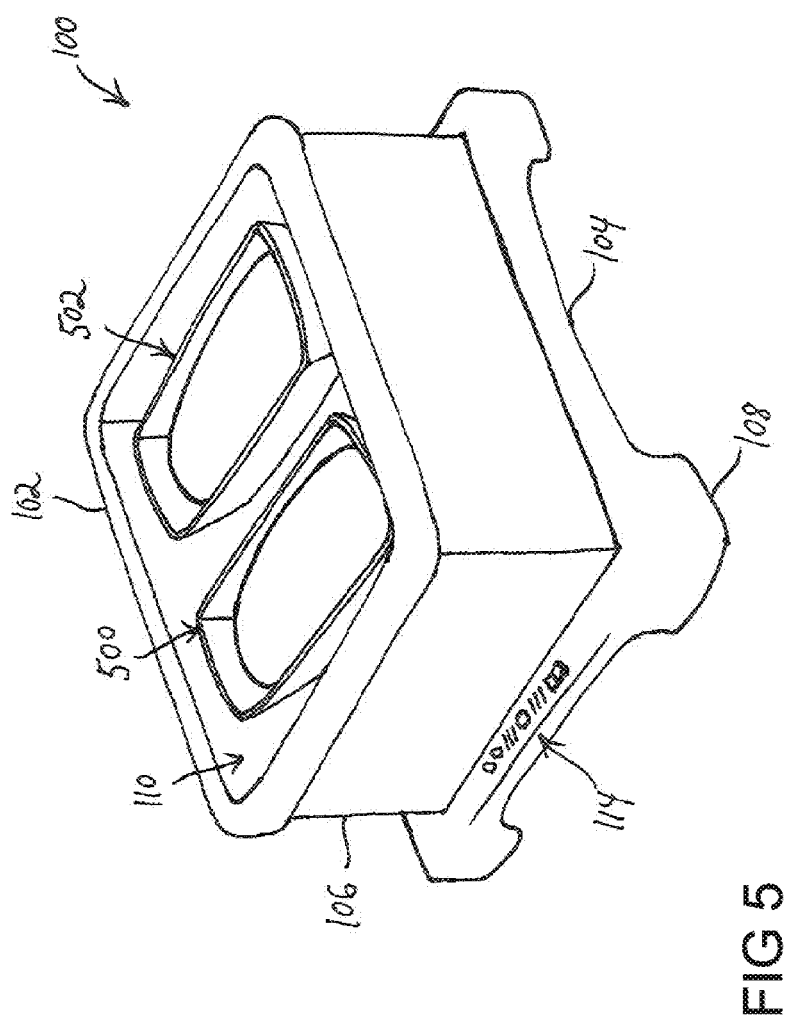
FIG. 5 is an oblique view of the preferred embodiment of FIG. 3B in its closed configuration, showing two bread pans contained within the box.

FIG. 4 is an oblique angle view of the preferred embodiment of FIG. 3B showing a mixing bowl 400 containing bread dough inside the box 100 and visible through the window 110 included in the top 102 of the box 100. FIG. 5 is an oblique angle view of the preferred embodiment of FIG. 3B showing two bread pans 500, 502 containing bread dough inside the box 100 and visible through the window 108 included in the top 102 of the box 100.

Figure 6:
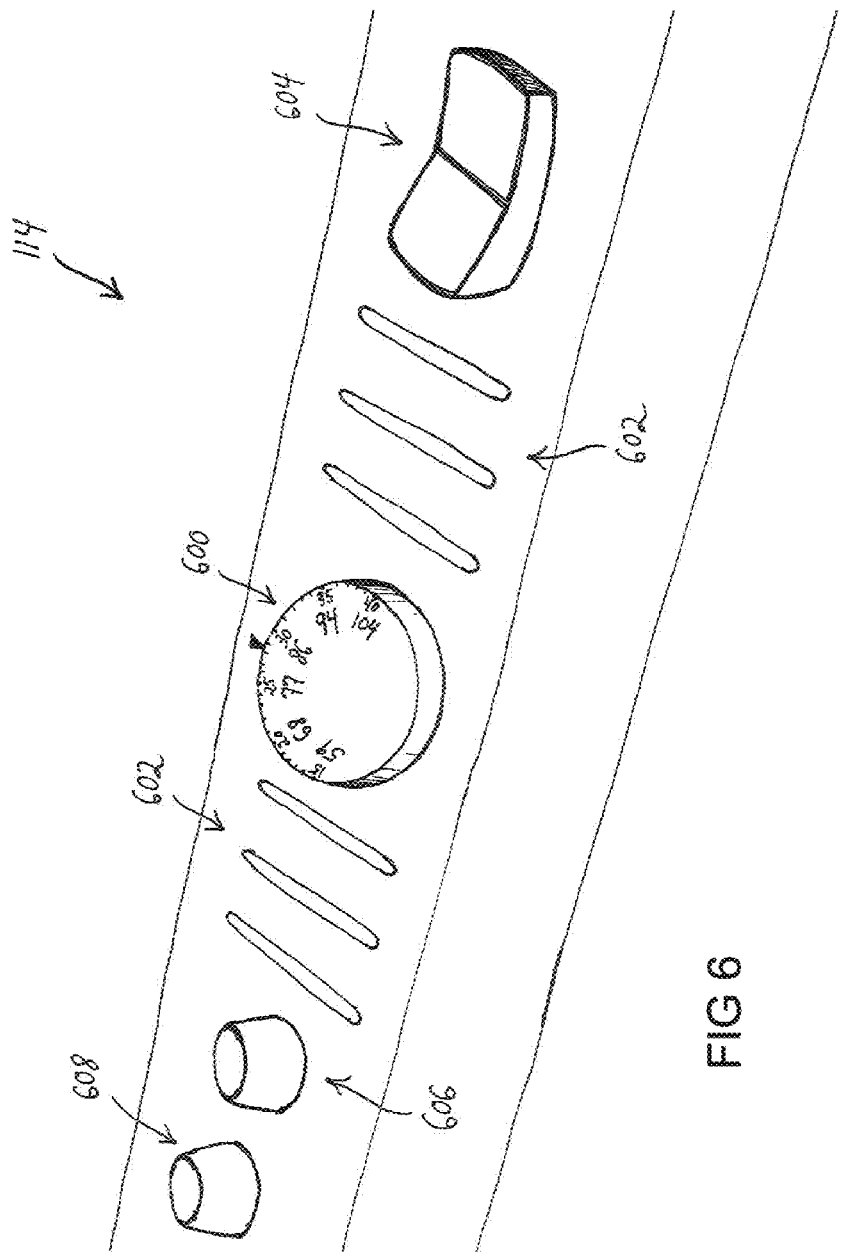
FIG. 6 is an oblique view of a control panel of a preferred embodiment.

FIG. 6 is an oblique angle view of a control panel 114 in a preferred embodiment. The control panel 114 includes an adjustable thermostat 600 that can be used to control the temperature within the box 100. In the embodiment of FIG. 6, the thermostat 600 has Celsius readings on its outer circumference, as well as Fahrenheit readings below the Celsius readings. Openings 602 in the control panel cooperate with channels (not shown) inside the box 100 that act as an exhaust ventilation system. In preferred embodiments, the openings are slots. These slots 602 selectively allow warm air to escape from the box, facilitating thermostat 600 control of the temperature inside the box 100.

The control panel 114 also includes a power switch 604. In the embodiment of FIG. 6, the power switch 604 is a three-position rocker switch which can be set to low, medium, or high power. The switch 604 can change the active area of the heater, and the wattage output. This can be useful to compensate for various ambient temperatures, and/or various temperatures of the dough upon insertion into the box. Similar embodiments include a thermostat that can be set to a desired bread dough rising temperature. In preferred embodiments, the bread dough rising oven is configured so as to maintain a bread dough rising temperature that is in the range of 80 to 120 degrees Fahrenheit.

Finally, the control panel 114 also includes lights 606, 608, preferably light emitting diodes, which indicate when the bread dough rising box 100 has been activated, and/or when the heating element is active. A light 606, 608 can also indicate when a desired temperature has been reached inside the box 100. Similar embodiments include a light that indicates activation of a safety mechanism that prevents application of current to the heater when an error condition is sensed, such as an improper configuration of the bread dough rising box or an internal temperature that exceeds 140 degrees Fahrenheit.

Figure 7:
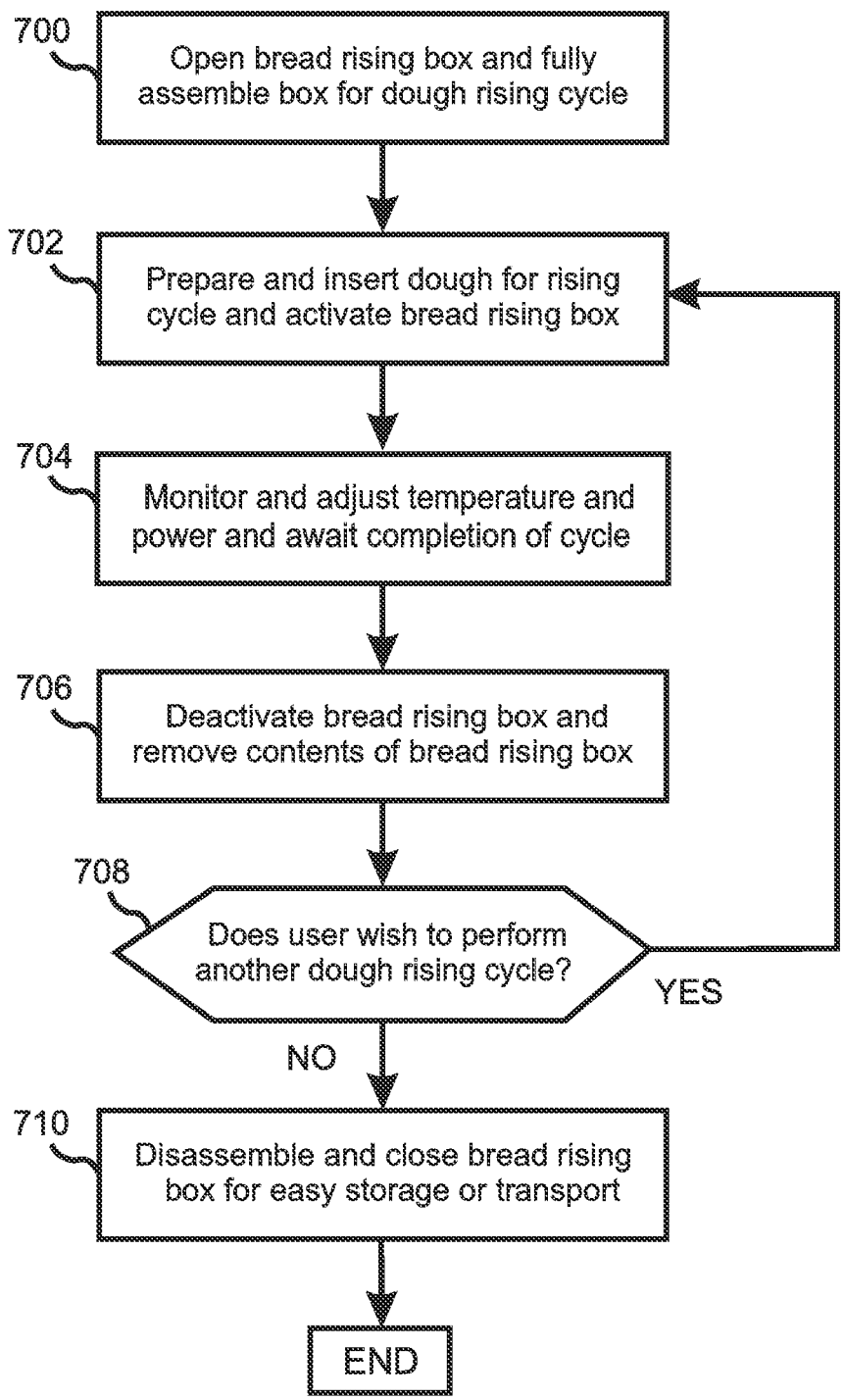
FIG. 7 is a flow diagram detailing the method of use of the invention.

FIG. 7 is a flow diagram detailing the method of use of the invention. First, the middle member 106 is unfolded then the bread dough rising box 100 is fully assembled 700. Bread dough is prepared and made ready for the desired bread dough rising cycle. When the bread dough rising box is assembled for dough rising and the bread dough is prepared for warming, the bread dough is inserted into the bread dough rising box and the power is turned on 702.

Once a dough rising cycle has begun, a user can then adjust and monitor the temperature inside the box, as well as the amount of power applied to the heating element 704. For example, the temperature may be set to a lower temperature for a first rise, and a higher temperature for a second rise. Furthermore, a user may wish to apply higher power to warm frozen dough, and lower power for dough that has already thawed to room temperature. When the rising cycle is finished, the power is shut off and the dough and its containers are removed 706. If another rising cycle is desired 708, the same procedure is repeated. If no further rising is desired 708, then the bread dough rising box is disassembled and closed once its temperature has returned to room temperature, 710. In its collapsed and compact state, the bread dough rising box is easily stored or transported.

Other modifications and implementations will occur to those skilled in the art without departing from the spirit and the scope of the invention as claimed. Accordingly, the above description is not intended to limit the invention except as indicated in the following claims.

What is claimed is:

1. A collapsible bread dough rising box, comprising:
   a bottom member;
   a top member;
   a collapsible middle member, the collapsible middle member being foldable so as to fit between the bottom member and the top member when the bread dough rising box is in a storage configuration, the collapsible middle member forming side walls of the bread dough rising box when the collapsible middle member is unfolded and installed between the bottom member and the top member, and the top member is placed on top of upper edges of the middle member thereby forming a closed box between the top member, the side walls of the middle member and the bottom member when the bread dough rising box is in a fully assembled configuration; and
   a heating element, cooperative with one of the bottom member and the top member, the heating element being able to warm an interior space formed by the bottom member, the top member, and the collapsible middle member when the bread dough rising box is in the fully assembled configuration; and wherein the collapsible middle member is attached to the bottom member by a hinge that allows the collapsible middle member to transition between the storage configuration and the fully assembled configuration while remaining attached to the bottom member.

2. The bread dough rising box of claim 1, further comprising an attachment mechanism that is able to attach the top member to the bottom member so as to hold the collapsible middle member between the top member and bottom member when the bread dough rising box is in the storage configuration.

3. The bread dough rising box of claim 2, wherein the attachment mechanism is a detachable hinge that allows the top member to be detached from the bottom member when the hinge is rotated beyond a certain angle.

4. The bread dough rising box of claim 1, wherein the collapsible middle member includes a living hinge having a thin strip of plastic that can be repeatedly bent without breaking.

5. The bread dough rising box of claim 4, wherein:
   the middle member includes a panel with a slotted edge having at least one opening;
   the living hinge includes an edge with at least one protrusion; and
   the living hinge can be attached to the panel by inserting the edge of the living hinge into the slotted edge of the panel, thereby causing the protrusion on the edge of the living hinge to engage with the opening in the slotted edge of the panel.

6. The bread dough rising box of claim 1, wherein the middle member includes a total of four short panels and two long panels, the panels being interconnected at their edges by hinges.

7. The bread dough rising box of claim 1, wherein the top member includes a transparent window that enables contents enclosed within the bread dough rising box to be viewed when the bread dough rising box is in the fully assembled configuration.

8. The bread dough rising box of claim 1, wherein the heating element is able to use at least one of convection, radiation, and conduction to warm the interior space of the bread dough rising box when the bread dough rising box is in the fully assembled configuration.

9. The bread dough rising box of claim 1, wherein the heating element is a low-power heating element.

10. The bread dough rising box of claim 1, wherein the heating element is a thin heating element affixed by an adhesive to the bottom member of the bread dough rising box.

11. The bread dough rising box of claim 1, wherein, when the bread dough rising box is in its fully assembled configuration, the heating element is able to maintain a temperature within the interior of the bread dough rising box of between 80 and 120 degrees Fahrenheit.

12. The bread dough rising box of claim 1, further comprising an indicator light that indicates one of:
    activation of the bread dough rising box;
    application of power to the heating element;
    achieving of a desired temperature within the interior of the bread dough rising box; and
    activation of a safety mechanism.

13. The bread dough rising box of claim 1, further comprising a rack that is able to support a bread dough container above the bottom member so as to avoid overheating of bread dough contained within the bread dough container.

14. The bread dough rising box of claim 1, further comprising a safety mechanism that prevents application of power to the heating element if an improper rising condition is detected.

* * * * *